US 12,502,011 B2

(12) United States Patent
Harrell et al.

(10) Patent No.: US 12,502,011 B2
(45) Date of Patent: *Dec. 23, 2025

(54) BULK MATERIAL DISPENSING SYSTEM (71) Applicant: Fasteners for Retail, Inc., Twinsburg, OH (US)

(72) Inventors: Christopher A. Harrell, New Berlin, WI (US); James P. Ihrcke, West Allis, WI (US); Jeffrey M Koss, Oak Creek, WI (US)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,230

(22) Filed: Mar. 5, 2024

(65) Prior Publication Data

US 2024/0206647 A1    Jun. 27, 2024

Related U.S. Application Data

(63) Continuation of application No. 17/750,020, filed on May 20, 2022, now Pat. No. 11,963,624.

(60) Provisional application No. 63/191,810, filed on May 21, 2021.

(51) Int. Cl.
*A47F 1/03*        (2006.01)
*B65D 83/06*       (2006.01)

(52) U.S. Cl.
CPC .............. *A47F 1/03* (2013.01); *B65D 83/06* (2013.01)

(58) Field of Classification Search
CPC .................................. A47F 1/03; B65D 83/06
See application file for complete search history.

(56) References Cited

U.S. PATENT DOCUMENTS

| 5,603,452 | A | * | 2/1997 | Hester | E01H 10/005 239/263.1 |
| 5,778,767 | A | * | 7/1998 | Rudesill | A47J 37/1228 221/265 |
| 5,975,357 | A | * | 11/1999 | Topar | A47J 31/467 222/64 |
| 6,267,496 | B1 | * | 7/2001 | Real | B01F 35/2209 366/132 |
| 7,178,697 | B2 | | 2/2007 | Brundick et al. | |

(Continued)

FOREIGN PATENT DOCUMENTS

| CN | 112313485 A | 2/2021 |
| KR | 200307733 Y1 | 3/2003 |

OTHER PUBLICATIONS

USPTO. Office Action relating to U.S. Appl. No. 17/750,020, dated May 11, 2023.

*Primary Examiner* — Bob Zadeh
(74) *Attorney, Agent, or Firm* — Honigman LLP; Andrew J. Boes (57) ABSTRACT

The present system is used for metered dispensing of bulk material. The system includes a hopper containing the bulk material, a base supporting the hopper, and a gate removably interposed between a hopper outlet and a base outlet. The gate rotates between positions either allowing or preventing flow of the bulk material from the hopper outlet to the base outlet. An impeller is located inside of the hopper, extending from an inner surface of the hopper to agitate the bulk material before, during, or after dispensing to ensure the hopper outlet is not blocked.

19 Claims, 6 Drawing Sheets

(56) References Cited

U.S. PATENT DOCUMENTS

| | | |
|---|---|---|
| 10,450,152 B2 | 10/2019 | Brundick et al. |
| 11,370,604 B1* | 6/2022 | Gold ................... B65D 83/06 |
| 11,963,624 B2* | 4/2024 | Harrell ................ B65D 83/06 |
| 2002/0148858 A1* | 10/2002 | Bertone ............... A47J 31/401 |
| | | 222/129.4 |
| 2003/0094465 A1 | 5/2003 | Ellis |
| 2005/0269366 A1* | 12/2005 | Brundick ............... B65B 37/04 |
| | | 222/185.1 |
| 2006/0113324 A1* | 6/2006 | Rudesill ................ A47F 1/035 |
| | | 222/132 |
| 2008/0144429 A1 | 6/2008 | Simmons et al. |
| 2008/0230558 A1* | 9/2008 | Koerner ............. G07F 17/0071 |
| | | 222/54 |
| 2009/0001101 A1 | 1/2009 | Zahradka et al. |
| 2011/0062187 A1 | 3/2011 | Johnson et al. |
| 2013/0126556 A1 | 5/2013 | Riester et al. |
| 2016/0109273 A1 | 4/2016 | LaFosse |
| 2019/0313834 A1* | 10/2019 | Bertness ............... B65G 65/46 |
| 2019/0365140 A1 | 12/2019 | Wallis |
| 2024/0206647 A1* | 6/2024 | Harrell ................ B65D 83/06 |

\* cited by examiner

BULK MATERIAL DISPENSING SYSTEM

CROSS-REFERENCE TO RELATED APPLICATIONS

This application is a continuation of, and claims priority under 35 U.S.C. § 120 from, U.S. patent application Ser. No. 17/750,020, filed on May 20, 2022, which claims the benefit of U.S. Provisional Patent Application No. 63/191,810, filed on May 21, 2021, the contents of which are incorporated herein by reference in their entirety.

BACKGROUND

The present disclosure is directed to a dispenser system for bulk material, specifically a dispensing system capable of automatic dispensing of material.

Bulk material dispensers have evolved from open-topped containers of goods to closed, gravity-feed systems that allow for unassisted descent of material from a main hopper to a dispensing outlet. The evolution of such bulk material dispensers has occurred to prevent contamination of the material and waste due to spillage. Since such bulk material dispensers can include food dispensers in food preparation or dining establishments and bulk material dispensers in stores, prevention of such contamination and waste is highly desirable.

Unfortunately, material can block the dispenser outlet after becoming compacted or otherwise wedged in place, preventing the material from exiting the hopper. The reasons for blockage can vary, but are commonly dependent on the size, shape, flexibility, and/or surface characteristics of the material. In order to move compacted material, the entire bulk material dispenser must be agitated, which may not be possible for a fixed or large bulk material dispenser. Over-agitation can cause the bulk material dispenser to fall over or be damaged, or for parts to separate. Furthermore, mixed material may separate when settling in the hopper or during dispensing, particularly if any of the aforementioned material characteristics differ enough to allow different rates of descent. Some non-limiting examples of commonly dispensed mixed material include trail mixes with mixed nuts, fruit, and/or candy, and cereals with marshmallows or dried fruit.

There is an unmet need in the art for a system capable of automatic dispensing of bulk material without becoming blocked or allowing separation of mixed material.

SUMMARY

An example embodiment of the present disclosure is a bulk material dispensing system. The system includes a hopper having a hopper outlet, a base supporting the hopper, the base having an activation sensor and a base outlet, and a gate removably interposed between the hopper outlet and the base outlet. The gate has a first position allowing flow of the bulk material from the hopper outlet to the base outlet and a second position preventing flow of the bulk material from the hopper outlet to the base outlet. An impeller is located inside of the hopper, extending from an inner surface of the hopper.

The objects and advantages will appear more fully from the following detailed description made in conjunction with the accompanying drawings.

DETAILED DESCRIPTION

In the present description, certain terms have been used for brevity, clarity and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Referring to the FIGS. 1-8, the system 100 includes a hopper 110 mounted on a base 120. An activation sensor 121 located below a base outlet 122 controls the opening and closing of a gate 123. When a container is placed in the area below the base outlet 122, the activation sensor 121 signals a control board 130 which triggers the gate 123 to open for an interval of dispensing time. When the gate 123 is open, material can flow from a hopper outlet 113 to the base outlet 122, and from there to the container. An impeller 127 located within the hopper 120 agitates the material to allow flow and prevent blockage of the hopper outlet 113 either during or after dispensing. An optional spill tray 140 (not shown) may be located below the base outlet 122 to capture any overflow from the container. All elements of system 100 coming into contact with the dispensed material are manufactured from substances which will not react with the material. By way of non-limiting example, a dispenser for cereal may be manufactured from food-grade polymers and stainless steel.

The hopper 110 shown in FIG. 1-5 may be removable or fixed to the base 120. The first configuration allows removal, cleaning, and replacement of the hopper 110 as necessary, while the second prevents accidental dislodging from the base 120. The hopper 110 has a hopper inlet 111 for loading the material, which may be covered by a hopper cover 112. The hopper cover 112 may be entirely or partially removable from the hopper 110, and may be hinged to facilitate partial removal. Because the system 100 is gravity-fed, at least one lower inner surface of the hopper 110 in the embodiment shown in FIG. 1-5 slopes at a downward angle to guide bulk material toward the hopper outlet 113. In this embodiment, the impeller 127 is located along this lower surface, upslope from the hopper outlet 113. Another embodiment of the hopper 110 does not have a lower surface, with material descending in a completely vertical direction. In this alternate embodiment, the impeller 127 is located on an inner surface of the hopper 110 above the hopper outlet 113.

In certain embodiments, the hopper 110 and hopper cover 112 may be fully or partially made from a fully or partially transparent or translucent material to allow identification of the materials and/or estimation of the amount of material left in the system 100. In certain embodiments, the hopper 110 and hopper cover 112 may be fully or partially made from a fully or partially opaque material. The hopper 110 may be unitary or multi-piece, allowing disassembly for repair, replacement, and/or cleaning, or to allow fabrication from a combination of opaque and translucent materials.

Figure 7:
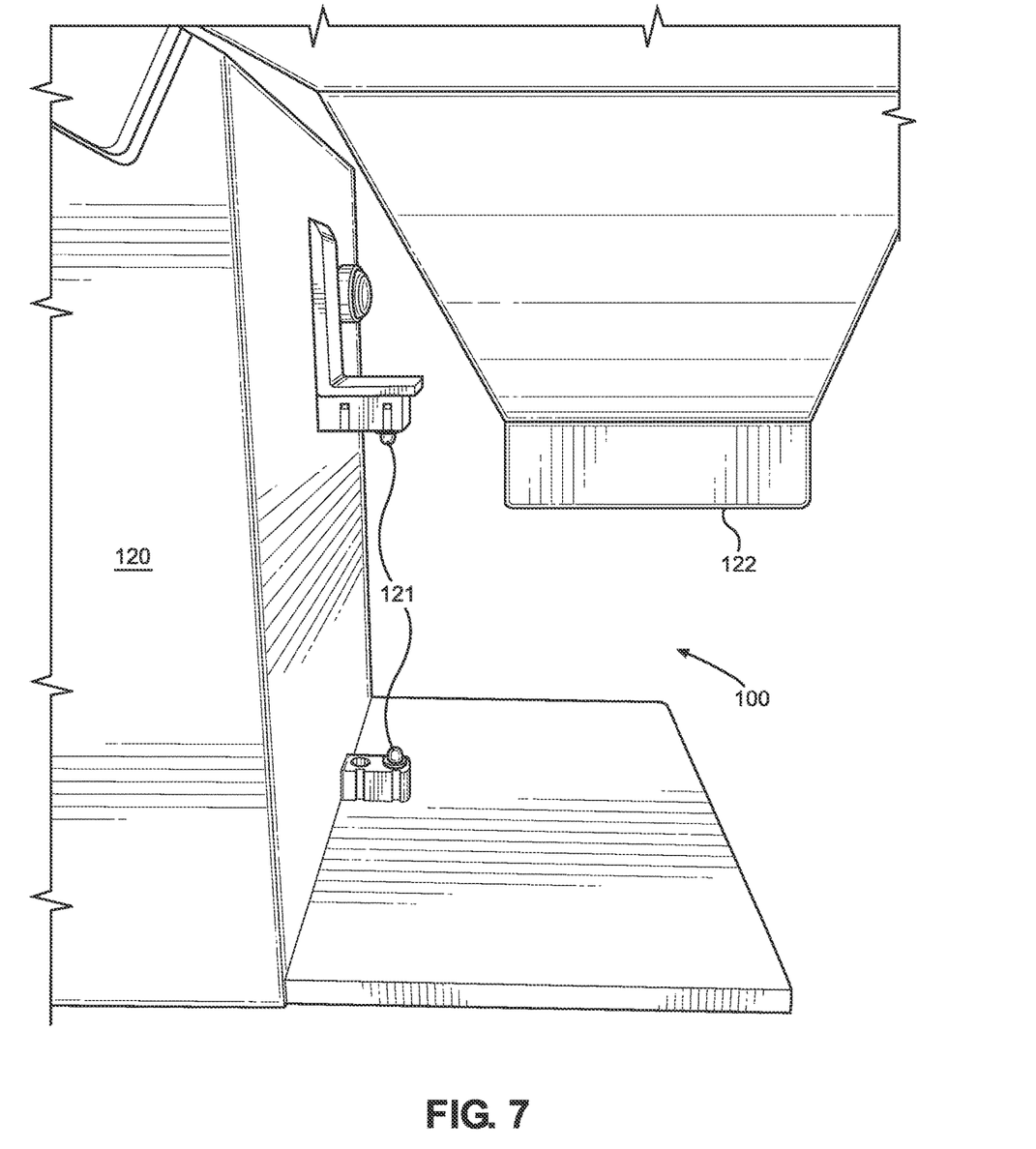
FIG. 7 is a partial left side view of an exemplary embodiment of the bulk material dispenser system.
Figure 8:
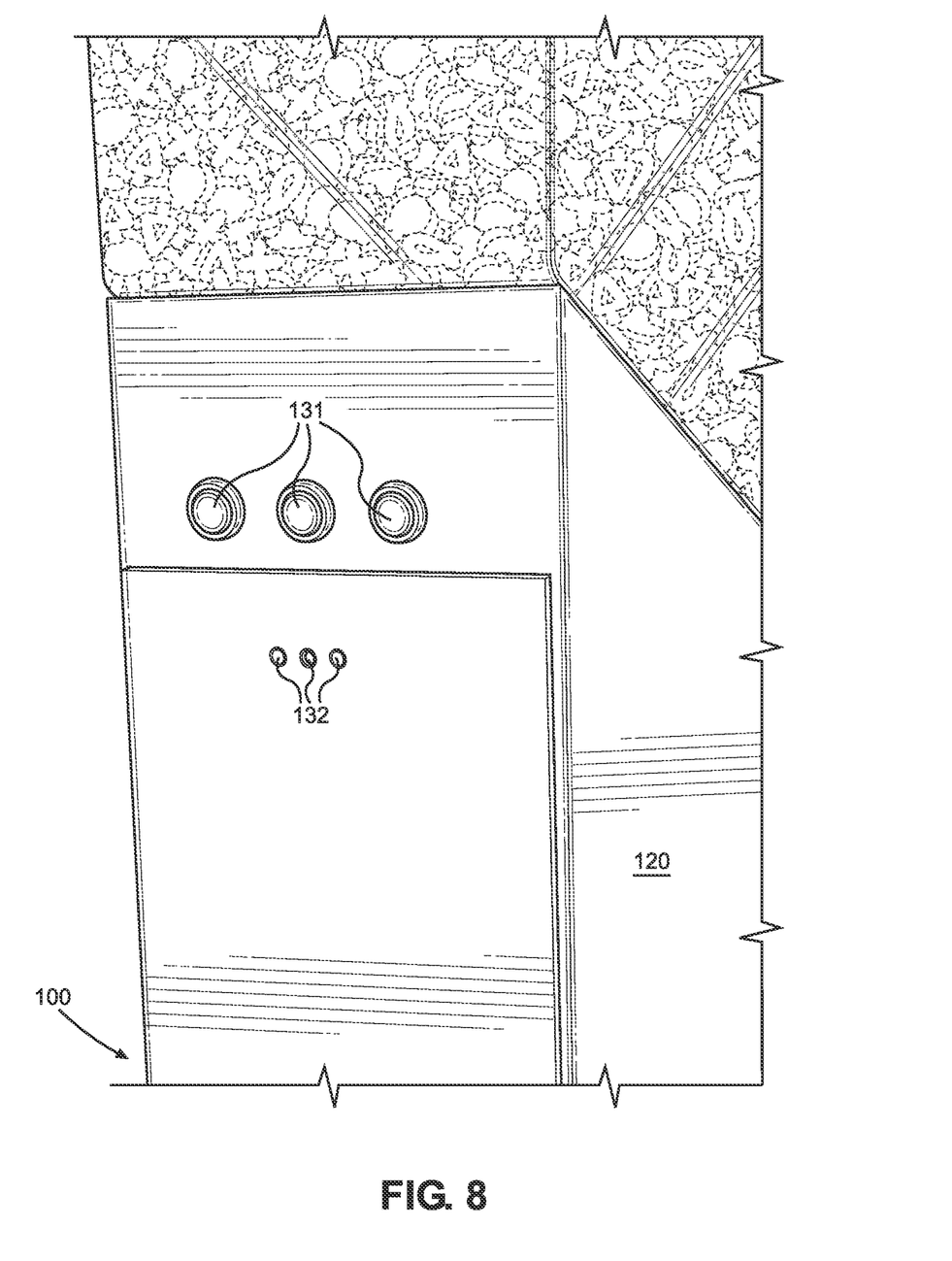
FIG. 8 is a rear view of an exemplary embodiment of the bulk material dispenser system.

The activation sensor 121 shown in FIG. 7 is operably connected to the control board 130. The activation sensor 121 may be an optical sensor, pressure sensor, contact sensor, or combination of sensors. In one embodiment, the control board 130 is preprogrammed with one or more predetermined dispensing time intervals, any of which may be selected through the use of at least one selector control 131 shown in FIG. 8. While the selector control 131 of the present embodiment is a button, the selector control 131 may also be a rotatable knob, switch, or any other selection regulator. Individual selector controls 131 may be allocated to specific time intervals, or a single selector control 131 may be used to choose between multiple time intervals. The selected time interval may be indicated by at least one selection indicator 132, indicia on the base 120 which align with the selector control 131 or with indicia on the selector control 131 to designate the selected time interval. In the exemplary embodiment, the selection indicators 132 are LEDs located below each of the selector controls 131. When a selector control 131 is pressed, the corresponding LED lights up. Multiple forms of indicia may also be used, such as, but not limited to, a label with alphanumeric characters indicating length of the time interval located below each LED.

While the control board 130 of the exemplary embodiment is programmed with three time intervals, the control board 130 may be programmed with more or fewer time intervals to accommodate a variety of bulk materials. Longer time intervals may be used for materials with a slow flow rate and/or those with a large volume to be dispensed, while shorter time intervals may be used for materials with a rapid flow rate and/or those with a small volume to be dispensed. The length of the time interval may also be based on a serving size, volume, or mass of a specific material. By way of non-limiting example, a dispenser system 100 for shelled peanuts may have a time interval shorter than a dispenser system 100 for hazelnuts, which may in turn have a shorter time than a dispenser system 100 for unshelled walnuts. By way of further non-limiting example, a time interval for half a cup of shelled peanuts may be shorter than a time interval for a cup of shelled peanuts. The time intervals on control board 130 may be programmable by a user or may be preset by the manufacturer.

Figure 1:
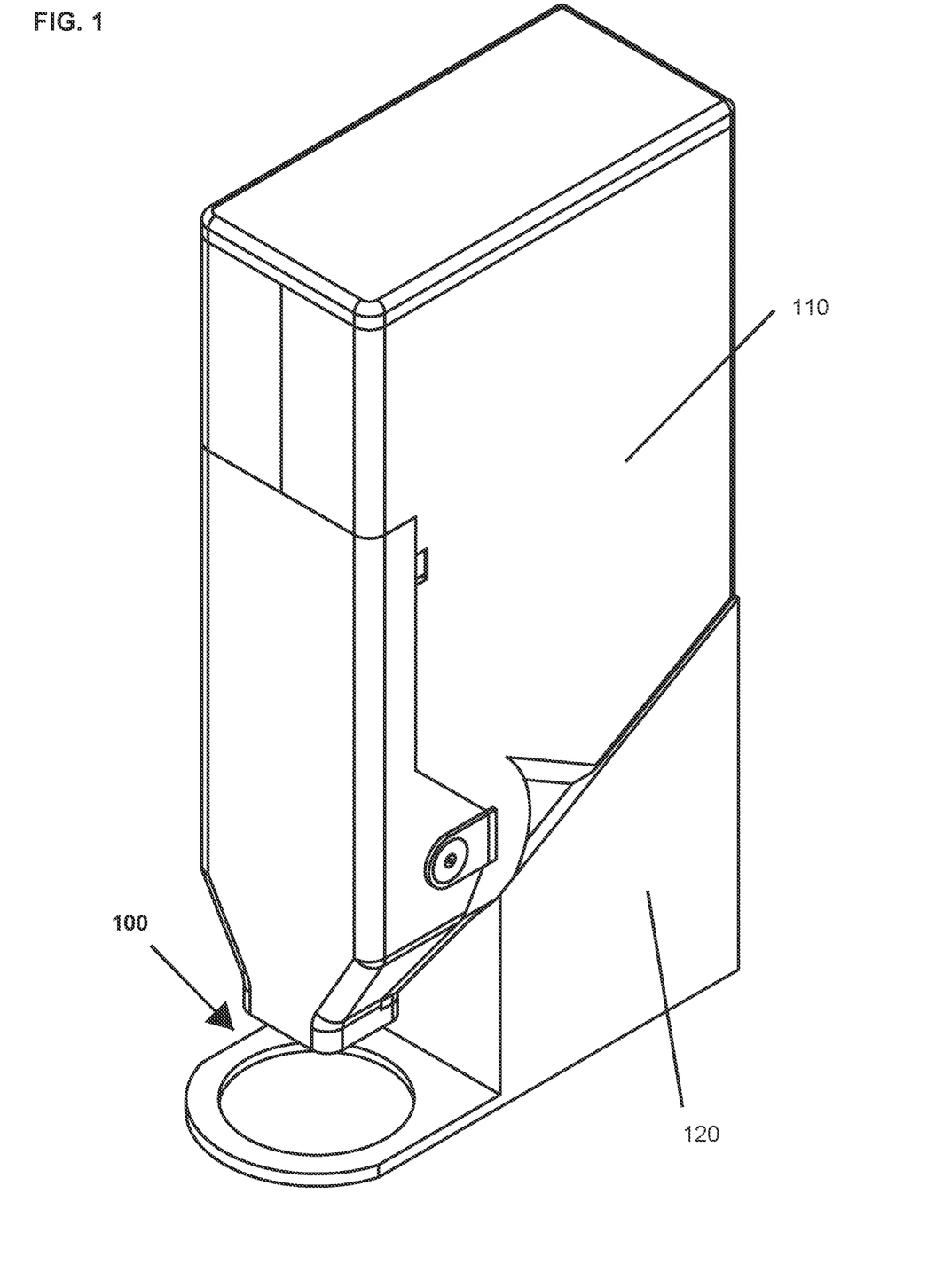
FIG. 1 is a perspective view of an exemplary embodiment of a bulk material dispenser system.
Figure 2:
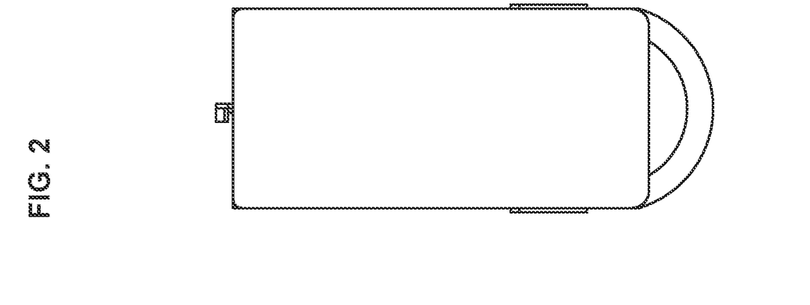
FIG. 2 is a top view of an exemplary embodiment of the bulk material dispenser system.
Figure 3:
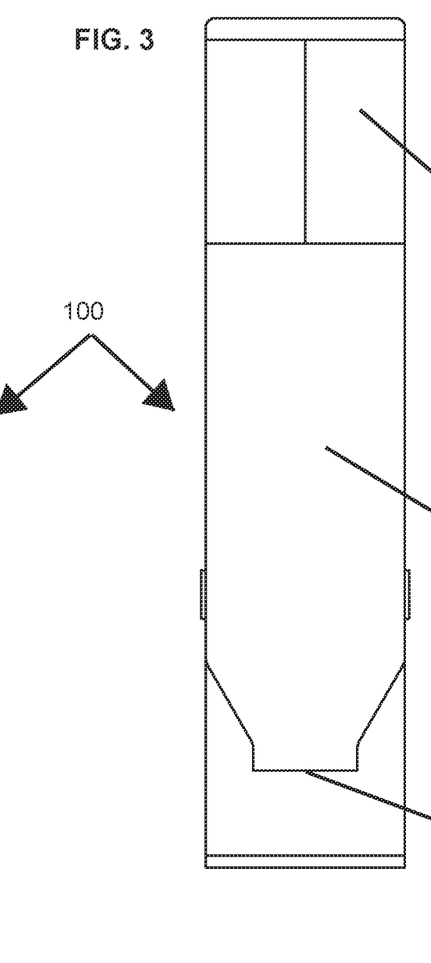
FIG. 3 is a front view of an exemplary embodiment of the bulk material dispenser system.
Figure 4:
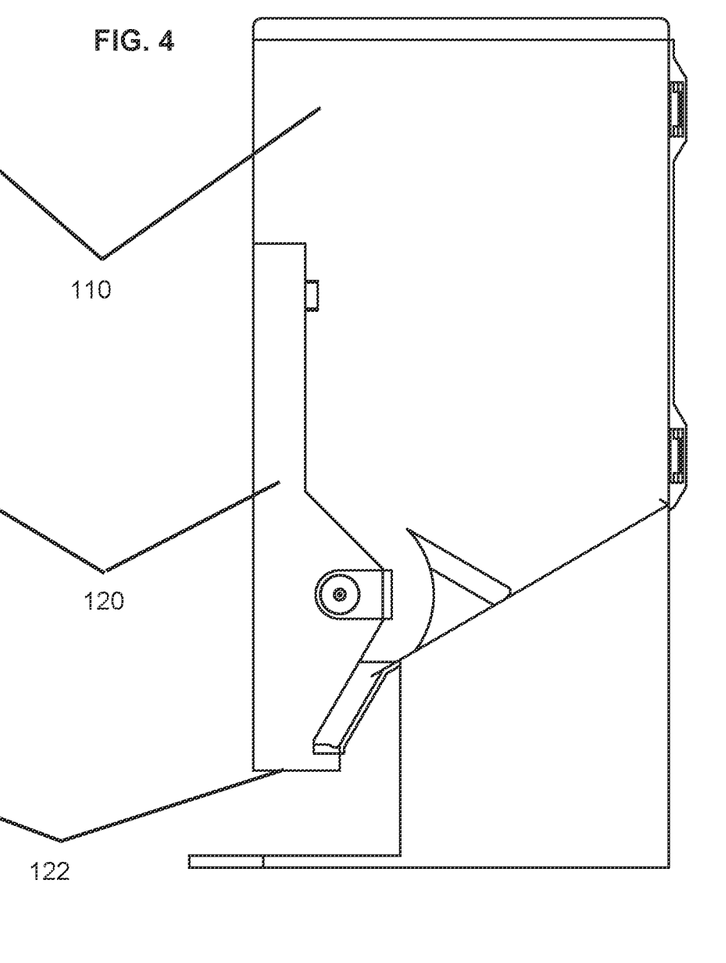
FIG. 4 is a right side view of an exemplary embodiment of the bulk material dispenser system.
Figure 5:
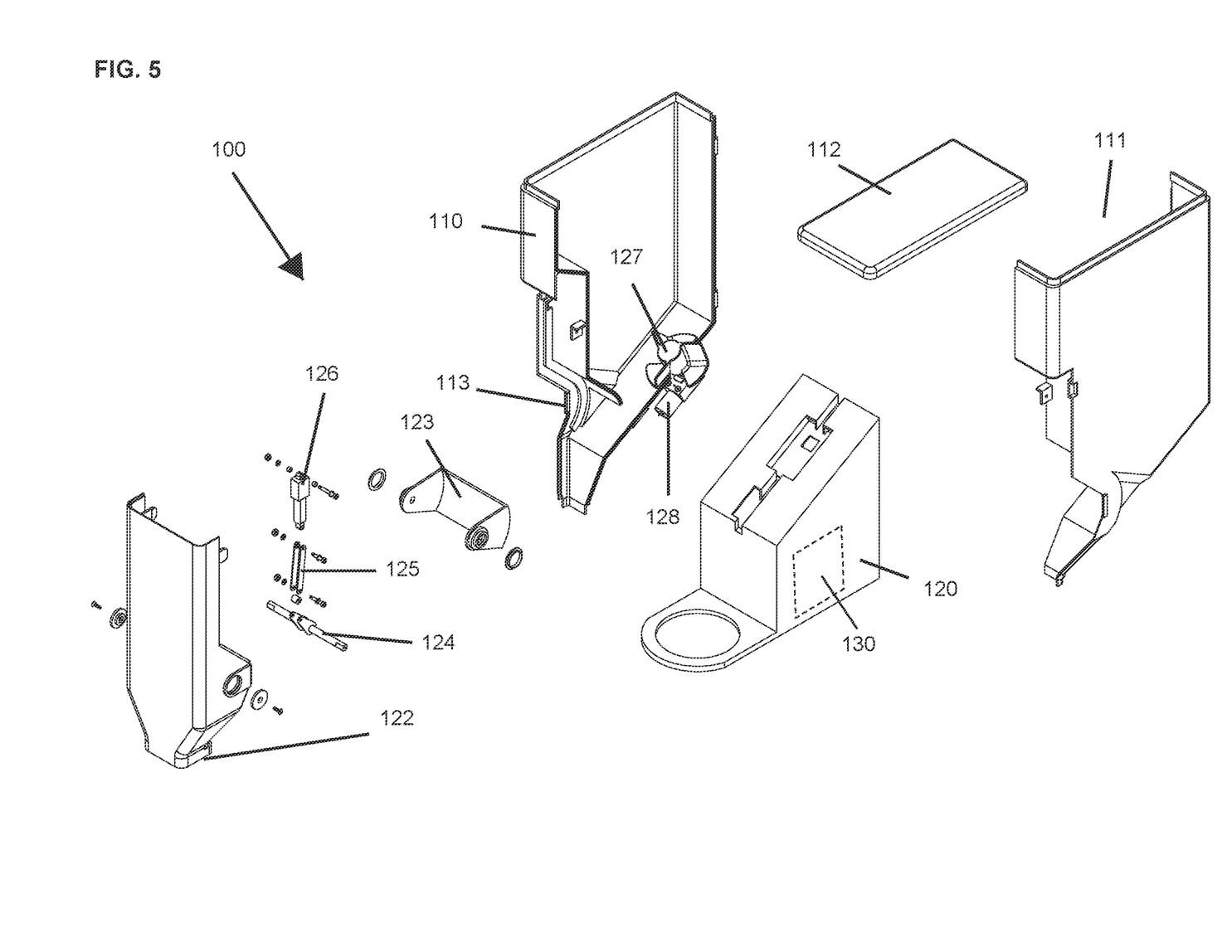
FIG. 5 is an exploded perspective view of an exemplary embodiment of the bulk material dispenser system.
Figure 6:
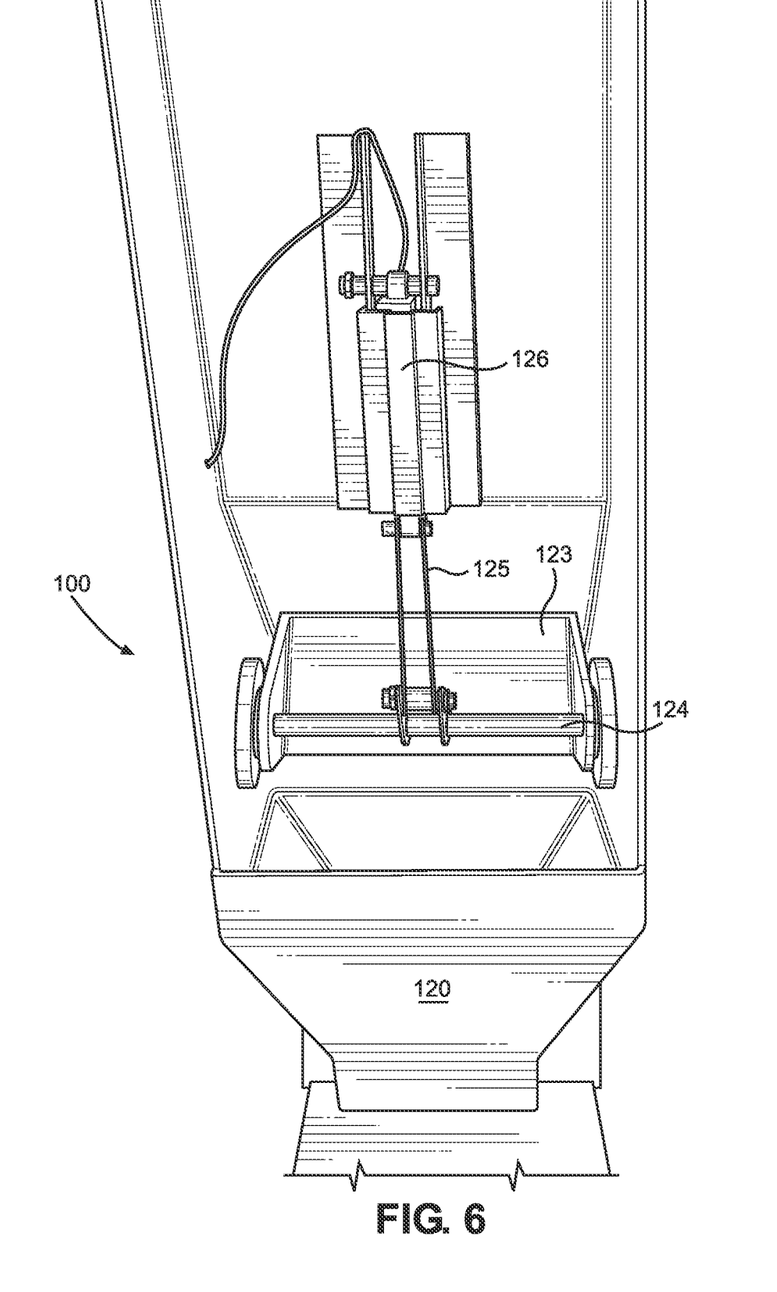
FIG. 6 is a partial front view of an exemplary embodiment of the bulk material dispenser system.

The gate 123 of the embodiment shown in FIGS. 5 and 6 is a single-piece U-shaped gate rotatably connected at either leg to the base 120, with the crossbar interposed between the hopper outlet 113 and the base outlet 122. A gate axle 124 extending between the legs interconnects the gate 123 and base 120, allowing for rotation of the gate 123 about the gate axle 124. In one embodiment, an actuator 126 is connected to the gate axle 124 by a gate arm 125 such that actuation of the actuator 126 causes the gate axle 124 to rotate in a first direction, which in turn causes the gate 123 to rotate in the first direction, moving the crossbar up to allow material flow. Likewise, reversal of the actuator 126 causes the gate axle 124 to rotate in a second direction counter to the first, which in turn causes the gate 123 to rotate in the second direction, moving the crossbar down to stop material flow. Other embodiments may reverse the rotational directions such that reversal causes rotation in the first direction and actuation causes rotation in the second direction. In one embodiment, the actuator 126 is a linear actuator. In another embodiment, the actuator 126 is a rotary actuator.

When a user triggers the activation sensor 121, the activation sensor 121 signals the control board 130. In one embodiment, the control board 130 coordinates movement of the gate 123 with rotation of the impeller 127 such that the impeller 127 begins to rotate only after the gate 123 is at least partially raised. In another embodiment, the control board 130 coordinates movement of the gate 123 with rotation of the impeller 127 such that the impeller 127 begins to rotate only after the gate 123 is closed. In another embodiment, the control board 130 coordinates movement of the gate 123 with rotation of the impeller 127 such that the impeller 127 rotates first when the gate 123 is at least partially raised and again after the gate 123 is closed. Rotation of the impeller 127 is caused by an impeller motor 128 located in the base 120 and operably connected to the control board 130. In various embodiments, the impeller motor 128 is a rotary gear motor or a linear gear motor.

Regardless of the time interval that the gate 123 is raised, the impeller 127 rotates clockwise, followed by a reverse rotation of equal magnitude counterclockwise. Depending on the orientation of the blades 129 on the impeller 128, the rotations may be reversed with a counterclockwise initial rotation and clockwise reverse rotation. In an embodiment, the initial rotation and reverse rotation of the impeller 127 will have the same magnitude. In another embodiment, the impeller 127 rotates through 90° clockwise, then through 90° counterclockwise.

This rotation serves to drive the blades 129 to break up any blockage that may have formed due to the bulk material wedging and/or sticking together in the hopper 110, allowing free descent of the bulk material by means of gravity without further propulsion. This also provides a mixing of any different materials in the hopper, one non-limiting example of which would be the oat and marshmallow cereal shown in the hopper in FIG. 8. Because the impeller 127 makes a partial rotation in one direction followed by a partial rotation in the opposite direction, the bulk material is not caught and crushed by the impeller 127, nor is the impeller 127 jammed.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the foregoing description.

What is claimed is:

1. A bulk material dispensing system comprising:
a hopper including a slanted lower inner surface leading to a hopper outlet;
a base supporting the hopper, the base having an activation sensor; and
an impeller located upslope of the hopper outlet and inside of the hopper, and the impeller extending from the slanted lower inner surface of the hopper, the impeller configured to rotate in a first direction then a second direction upon actuation to agitate and mix bulk material within the hopper to prevent compaction or blockage at the hopper outlet, wherein the first direction is an opposite direction of the second direction, wherein triggering the activation sensor causes rotation of the impeller through a predetermined angle of rotation in the first direction and the second direction.

2. The system of claim 1, wherein the base includes a base outlet, and the system further comprises:

a gate interposed between the hopper outlet and the base outlet, the gate having a first position allowing flow of the bulk material from the hopper outlet to the base outlet and a second position preventing flow of the bulk material from the hopper outlet to the base outlet.

3. The system of claim 2, wherein the impeller is located above the hopper outlet.

4. The system of claim 2, wherein the predetermined angle of rotation is less than a complete rotation.

5. The system of claim 2, wherein the impeller is operably connected to and driven by an impeller motor.

6. The system of claim 5, further comprising a control board operably connected to the impeller motor and the activation sensor.

7. The system of claim 6, wherein the control board is programmed with at least one predetermined dispensing time interval, wherein at a beginning of the at least one predetermined dispensing time interval the gate has the first position and at an end of the at least one predetermined dispensing time interval the gate has the second position.

8. The system of claim 6, further comprising at least one selector control operably connected to the control board, wherein actuating the at least one selector control selects at least one predetermined dispensing time interval.

9. The system of claim 1, wherein the activation sensor is at least one of an optical sensor, a pressure sensor, and a contact sensor.

10. A bulk material dispensing system comprising:
a hopper having a slanted lower inner surface leading to a hopper outlet;
a base supporting the hopper, the base having an activation sensor;
an impeller located upslope of the hopper outlet and inside of the hopper, and the impeller extending from the slanted lower inner surface of the hopper, wherein the impeller is operably connected to and driven by an impeller motor to agitate and mix bulk material within the hopper to prevent compaction or blockage at the hopper outlet; and
a control board operably connected to the impeller motor and the activation sensor.

11. The system of claim 10, wherein the base includes a base outlet, and the system further comprises:

a gate interposed between the hopper outlet and the base outlet, the gate having a first position allowing flow of the bulk material from the hopper outlet to the base outlet and a second position preventing flow of the bulk material from the hopper outlet to the base outlet.

12. The system of claim 11, wherein the control board coordinates movement of the gate with rotation of the impeller.

13. The system of claim 12, wherein the impeller begins to rotate only after the gate is at least partially raised or after the gate is closed.

14. The system of claim 11, wherein the gate is rotatably connected to the base such that a portion of the gate may be interposed between the hopper outlet and the base outlet.

15. The system of claim 14, wherein a gate axle interconnects the gate and the base such that the gate rotates about the gate axle and an actuator is connected to the gate axle by a gate arm such that actuation of the actuator causes the gate axle to rotate in a first direction, which in turn causes the gate to rotate in the first direction and allows the bulk material to flow from the hopper.

16. The system of claim 15, wherein the actuator is connected to the gate axle by the gate arm such that actuation of the actuator causes the gate axle to rotate in a second direction, causing the gate to rotate in the second direction and blocking the bulk material from flowing from the hopper.

17. The system of claim 15, wherein actuator is a linear actuator or a rotary actuator.

18. The system of claim 11, wherein the gate is a single-piece U-shaped gate having two legs interconnected by a crossbar.

19. The system of claim 10, wherein the activation sensor is at least one of an optical sensor, a pressure sensor, and a contact sensor.

* * * * *